UNITED STATES PATENT OFFICE 2,644,790

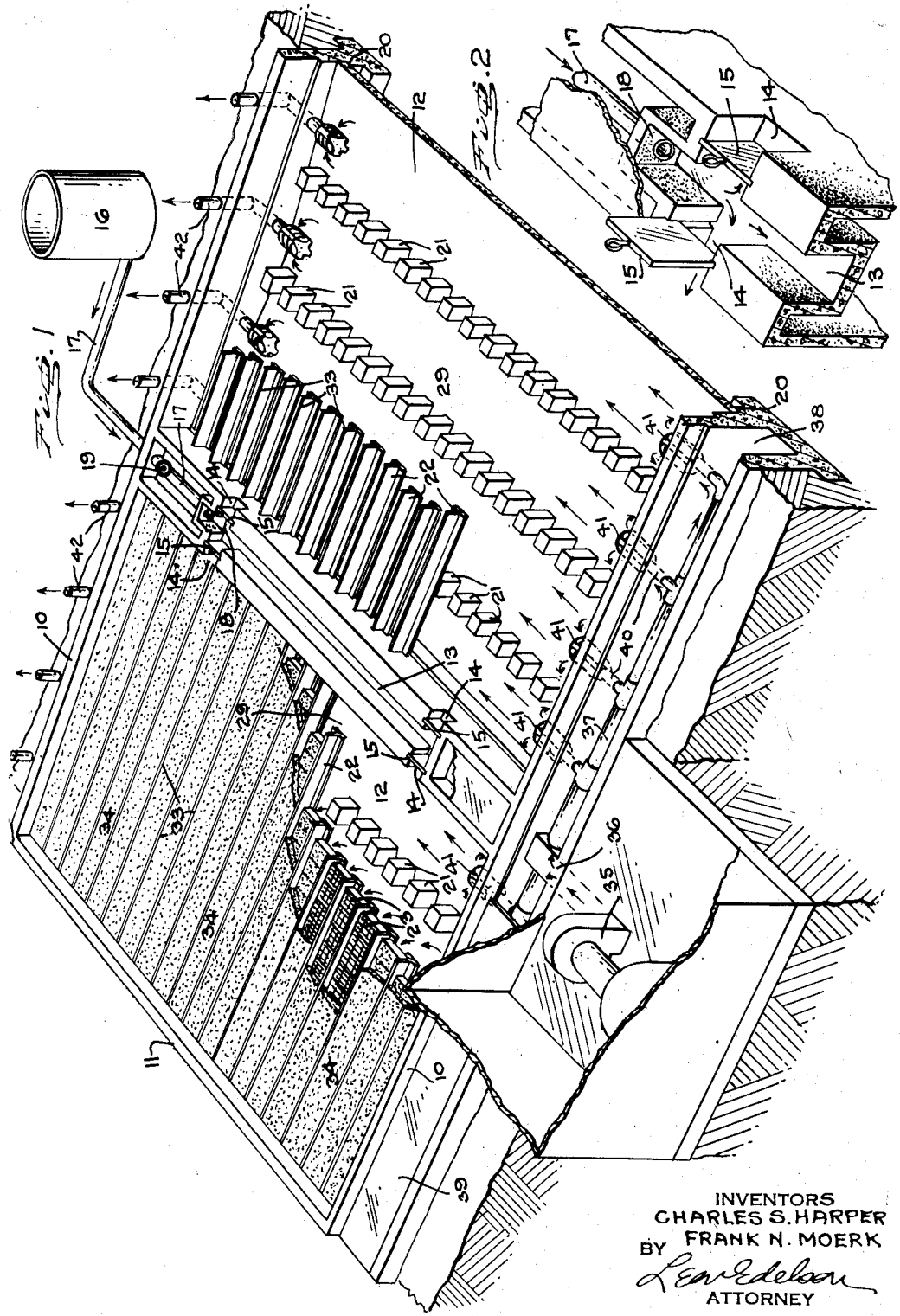

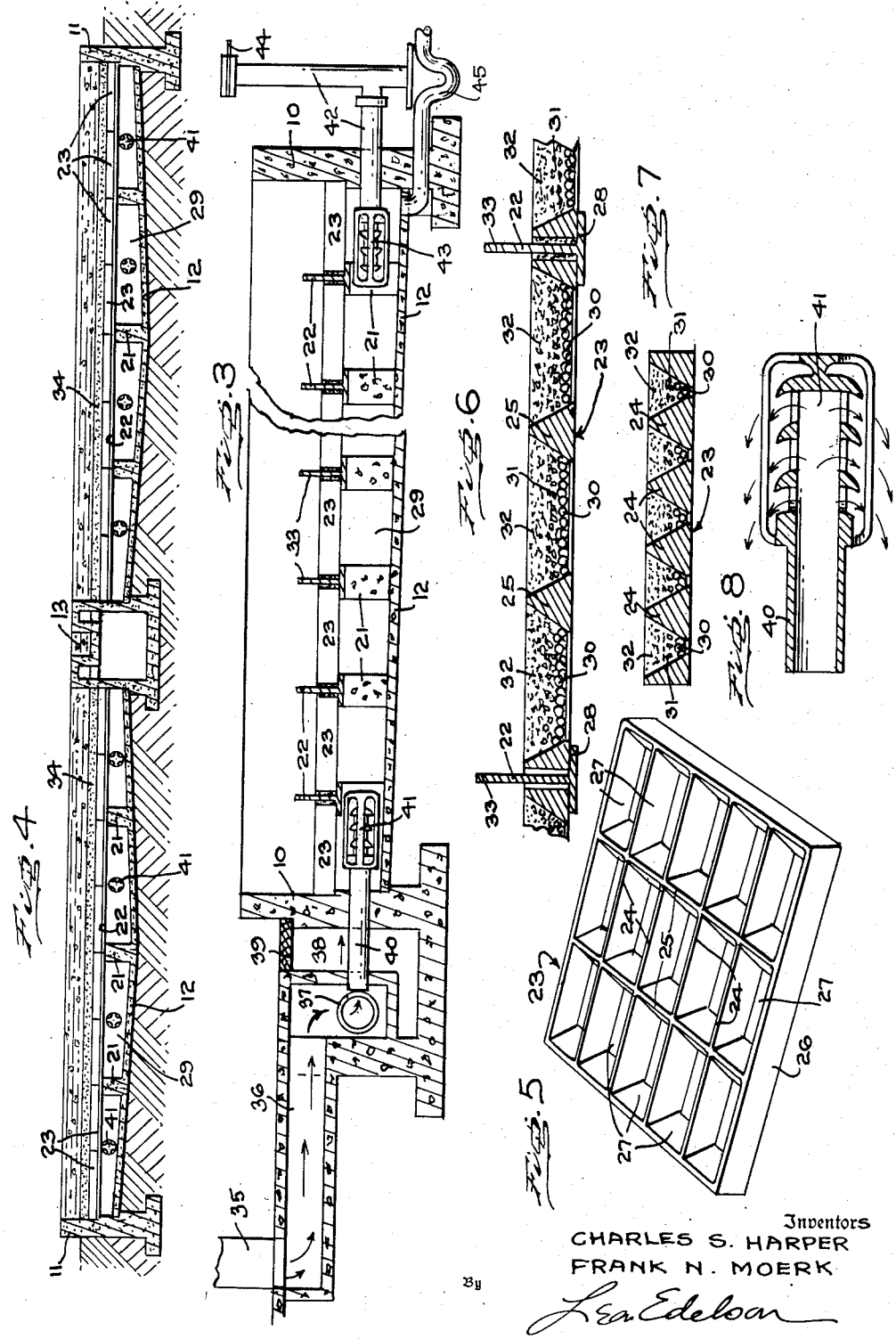

APPARATUS FOR HANDLING SLUDGE

Charles S. Harper and Frank N. Moerk,
Philadelphia, Pa.

Application December 7, 1949, Serial No. 131,564

7 Claims. (Cl. 210—2)

This invention relates generally to the handling of sewage and more particularly to an improved apparatus for and method of drying the digested sewage sludge as received from the sewage disposal plant.

Heretofore and prior to the present invention, it has been the conventional practice to subject the digested sewage sludge to the action of the sun or other source of heat directed against the top surface of the sludge deposit, but experience has taught that the heat so applied does not effectively dry the sludge free of its moisture content. It has been found that when the sludge deposit is deprived of such heat, the moisture present beneath or in the bottom stratum of the deposit is drawn up into the sludge by capillary action. Inasmuch as in all of the present known systems for drying sewage sludge, a substantial amount of water or moisture is at all times present beneath the sludge deposit, the latter is constantly subject to infiltration of moisture by capillary action which is at best only partially counteracted by the application of heat to the top surface of the deposit.

The present invention has as its principal object the provision of a system for drying sewage sludge wherein the sludge bed is subjected to moisture-depriving heat applied to the undersurface of the bed, the effect of the heat so applied being to dry the sludge bed upwardly from its bottom surface, in consequence of which there is no lower stratum of moisture or water to be drawn by capillary action upwardly into the sludge bed. Thus, by means of the apparatus and method of the present invention, as described in detail hereinafter, the sludge deposited upon its bed is so dried free of any appreciable moisture content that it may be easily and conveniently handled as a solid substance.

A further and important object of the present invention is to provide an apparatus for and method of drying sewage sludge which employs a filter-type foundation for the sludge deposit which is not subject to deterioration even under long continued use, which is inexpensive to construct, maintain and operate and which insures rapid drying of the sewage sludge deposited thereon.

Other objects and advantages of the present invention, such as those relating to economies effected by the construction and operation of the invention, will be apparent more fully hereinafter, it being understood that the present invention consists substantially in the combination, construction, location and relative arrangement of parts, as well as in the method of using the same, all as described hereinafter, as shown in the accompanying drawings and as finally pointed out in the appended claims.

In the accompanying drawings, Figure 1 is a general perspective view, with parts thereof partially broken away, showing the sludge-drying apparatus as constructed in accordance with and embodying the principles of the present invention;

Figure 2 is a perspective view showing on an enlarged scale one set of gates for controlling the distribution of the digested sewage sludge over the surface of the sludge-drying apparatus;

Figure 3 is a longitudinal sectional view of the apparatus shown in Figure 1;

Figure 4 is a transverse sectional view thereof;

Figure 5 is a perspective view of one of the sludge draining elements;

Figure 6 is a sectional view (longitudinal) of a portion of the sludge-supporting bed showing one of the drainage elements packed with aggregate for support of the sludge thereon;

Figure 7 is a transverse sectional view of the aggregate-filled drainage element; and Figure 8 is a longitudinal sectional view of one of the discharge nozzles for delivery of heated air into the chamber beneath the sludge bed.

Referring now more particularly to the drawings, it will be observed that the apparatus of the present invention includes a main foundation formed of concrete, brick or the like having parallel side enclosing walls 10—10, parallel end walls 11—11 and a pair of floor sections 12—12, each of which latter is preferably pitched downwardly from its opposite ends toward the transverse center line thereof, as most clearly shown in Figure 4. Extending transversely between the approximate midpoints of the side walls 10—10 is a sludge trough 13, the opposed walls of this trough being each provided with longitudinally spaced lateral passages 14—14 for discharge of the sewage sludge laterally of the trough onto the sludge filter bed presently to be described. Each of the lateral passages is preferably equipped with a vertically slidable gate 15 for controlling the discharge of sludge laterally of the trough, it being understood that the trough may be provided with as many longitudinally spaced, gate-controlled discharge passages as may be desired for uniform and rapid distribution of the sludge over the filter bed.

The digested sewage sludge to be treated in the apparatus of the present invention is delivered to the distribution trough 13 from a storage tank 16 by way of a conduit 17 leading from the tank to a discharge passage 18 formed in one end of the trough, the conduit 17 being fitted with a gate valve 19 for controlling the discharge of the sludge into the passage 18. The sludge trough 13 and the side and end enclosure walls 10—10 and 11—11 of the foundation unit are preferably formed as a monolithic structure suitably supported upon the ground, the floor 12—12 of the unit being also supported upon the ground with its marginal edges resting upon rabbetted shoulders 20 formed upon the inner surfaces of the walls 10—10 and 11—11.

Formed upon the upper surface of the floor sections 12—12 are a plurality of parallel rows of uniformly spaced concrete or brick piers 21, each longitudinal row of which support a longitudinally extending beam 22 of structural steel. These beams, which are of inverted T-shape, are thus disposed in transversely spaced, parallel relation over the full surface of each of the floor sections 12—12 and are designed to support therebetween a plurality of drainage elements 23 of the form and construction most clearly shown in Figure 5.

These drainage elements 23 are each cast or molded of suitable material, preferably refractory material, into the form of a unitary structure having a plurality of intersecting bars 24 and 25 of generally triangular cross-section, the intersecting bars being confined within a marginal frame 26 of generally rectangular shape to provide an open grid-like structure having a plurality of separate compartments 27 each of which is open at its top and bottom and is provided with inwardly and downwardly inclined inner wall surfaces.

The grid-like drainage elements 23 are supported in edge to edge relation between adjoining pairs of the supporting beams 22 with the opposite ends of each element resting upon the opposed coplanar bottom flanges 28 of the beams. The drainage elements are thus commonly supported in a horizontal plane spaced vertically above the floor sections 12—12 to provide a bottom chamber or basin 29 which initially receives the excess water as it drains by gravity from the superimposed bed of sewage sludge and which finally serves as a chamber for the heating medium which is directed upwardly therefrom into and through the overlying bed of sludge.

Each of the drainage elements 23 is individually packed with suitably graded aggregate which while operative to permit relatively rapid passage therethrough of the water present in the sewage sludge yet effectually prevents any seepage of the solid content of the sludge below the top surface of the packed drainage elements. Preferably, the aggregate employed to fill each drainage element consists, first, of a bottom layer 31 of relatively large, substantially spherical elements made of marble, glass, cement or the like; second, of an overlying layer 32 of stone or gravel of somewhat smaller size than the spherical elements; and, third, of a final top layer 32 of still smaller stone or gravel aggregate the upper surface of which is level with the top edges of the intersecting bars 24 and 25 of the grid-like drainage elements 23. It will be noted that the webs 33 of the several supporting beams project upwardly beyond the top level of the drainage elements 23 packed as aforesaid to provide a series of relatively narrow channels extending lengthwise of the apparatus, these channels being each filled with sand 34 (see Figure 1) to a level substantially flush with the top edges of the beam webs 33. It is over the top surface of this final layer of sand 34 that the digested sewage sludge is uniformly distributed for subsequent drying, the deposit of such sludge, which may be of any desired depth, usually from 4 to 8 inches, being confined within the area defined by the upstanding side and end walls 10—10 and 11—11 of the drying apparatus.

For drying the sludge in accordance with the principles of the present invention, the apparatus includes means for blowing heated air into the chamber 29 formed between the floor 12—12 and the overlying bed of the sludge, said means including a motor-driven blower unit 35 designed to deliver heated air through a duct 36 to a manifold 37 extending lengthwise along one side of the sludge supporting structure. Preferably, this manifold 37 is disposed in a protective channel 38 formed of concrete, brick or the like and which channel may be covered with a removable top cover 39. Extending laterally from the manifold 37 for projection through the side wall 10 of the sludge-supporting structure are a plurality of suitably spaced air delivery conduits 40 each fitted at its end with a suitable air distributing nozzle 41 of any desired type, but preferably of the form best shown in Figure 8, to insure wide spread of the heated air with minimum force or velocity. The heated air so discharged by the nozzles 41 into the chamber 29 is distributed across the full expanse of the chamber 29, such overall distribution being facilitated by discharge ducts 42 extending from the opposite side of the chamber 29 to atmosphere. Preferably, the inner ends of the discharge ducts 42 are fitted with air intake fittings 43 generally similar in construction to that of the air distributing nozzles 41, the draft through the ducts 42 being such as to induce positive flow of the heated air laterally across the full width of the chamber 29 to insure uniform application of the heated air to the under surface of the overlying sludge bed. The upper ends of the ducts 42 are each suitably provided with a damper 44 or the like (see Figure 3) for sealing these ducts against escape to atmosphere of the heated air following full and complete distribution of the heated air throughout the chamber.

In the operation of the apparatus, the first step, of course, is to deposit the digested sewage sludge to requisite depth over the entire surface of the sand-covered drainage elements 23, the excess water content of the sludge being thereafter permitted to drain off through the drainage elements into the chamber 29 from whence such water is discharged by way of one or more suitably trapped drains 45. Following such drainage of the water from the sludge and from the chamber 29, heated air is introduced into the chamber 29 by way of the several air discharge nozzles 41. During this initial introduction of heated air into the chamber 29 the dampers 44 of the draft ducts 42 are opened to insure uniform distribution of the heated air throughout the chamber 29, the heated air so introduced into the chamber 29 serving to preliminarily dry the sludge upwardly from its bottom surface until it commences to cake and develop cracks and fissures throughout its depth. Thereafter, the dampers 44 of the draft ducts 42 are closed, while the heated air is continued to be supplied under moderate pressure into the chamber 29 for escape upwardly through the cracks and fissures initially developed in the preliminarily dried sludge. This hot-air heating of the sludge is then continued until the sludge is sufficiently dried to permit it to be handled and removed as a solid substance, it having been found that for a sludge deposit of about 4 inches depth the drying is completed in approximately 24 hours, while for a sludge deposit of 8 inches depth, complete drying thereof is effected in about 60 hours.

The dried sludge is readily removed by shovels, scoops or the like with a minimum disturbance of the underlying layer of sand 34 due to the fact that the beam webs 33 are disposed with their upper edges substantially flush with the upper level of the sand and so prevent the shovels or scoops digging into the sand when they are propelled lengthwise of the beams. Upon removal of the dried sludge, the apparatus requires but little service to condition it for acceptance of a further supply of sludge from the sludge tank. Inasmuch as the water content of the sludge drains into the water catch basin 29 and thence to any suitably connected sewer system, it will be apparent that the sludge deposit undergoing treatment is substantially free of any underlying stratum of water which might tend to be reintroduced into the sludge deposit by way of capillary attraction. Also, any debris which might accumulate in the chamber 29 may be easily flushed therefrom into the sewage system in consequence of which there is at all times a free air space beneath the sludge bed which, even in the absence of the heated air, is of assistance in drying the sludge once it is rid of its excess water content.

It will be understood that the present invention is susceptible of various changes and modifications which may be made from time to time without departing from the general principles or real spirit thereof, and it is accordingly intended to claim the same broadly, as well as specifically, as indicated in the appended claims.

What is claimed to be new and useful is:

1. In an apparatus for drying digested sewage sludge, a sub-floor marginally enclosed by upstanding walls, a water-pervious bed for supporting a deposit of sludge in a horizontal plane spaced vertically above said sub-floor, said bed being also enclosed by said walls to provide a marginally enclosed chamber between said bed and sub-floor, means for draining from said chamber the sludge water filtered through the sludge-supporting bed, and means for circulating heated air through said chamber to dry said sludge deposit upwardly from its bottom surface, said last-mentioned means including an air blower and a conduit system for introducing air into one side of said chamber at points spaced along the length thereof.

2. In an apparatus as defined in claim 1 wherein said water-pervious bed includes a plurality of drainage elements arranged in coplanar relation, each of said drainage elements being in the form of an open grid filled with superimposed layers of aggregate of graduated size with the aggregate of maximum size forming the bottom layer thereof.

3. In an apparatus as defined in claim 1 wherein said water-pervious bed includes a plurality of drainage elements arranged in coplanar relation, each of said drainage elements being in the form of an open grid filled with superimposed layers of aggregate of graduated size with the aggregate of maximum size forming the bottom layer thereof, said drainage elements being covered by a layer of sand to form the top surface of said sludge-supporting, water-pervious bed.

4. In an apparatus for drying digested sewage sludge, a sub-floor marginally enclosed by upstanding walls, a water-pervious bed for supporting a deposit of sludge in a horizontal plane spaced vertically above said sub-floor, said bed being also enclosed by said walls to provide a marginally enclosed chamber between said bed and sub-floor, means for draining from said chamber the sludge water filtered through the sludge-supporting bed, and means for circulating heated air through said chamber to dry said sludge deposit upwardly from its bottom surface, said last-mentioned means including an air blower, a conduit system for introducing the heated air under pressure into the chamber at one side thereof and a conduit system for exhausting the heated air from the opposite side of said chamber.

5. In an apparatus for drying digested sewage sludge, a sub-floor marginally enclosed by upstanding walls, a water-pervious bed for supporting a deposit of sludge in a horizontal plane spaced vertically above said sub-floor, said bed being also enclosed by said walls to provide a marginally enclosed chamber between said bed and sub-floor, means for draining from said chamber the sludge water filtered through the sludge-supporting bed, and means for circulating heated air through said chamber to dry said sludge deposit upwardly from its bottom surface, said last-mentioned means including an air blower, a conduit system for introducing the heated air under pressure into the chamber at one side thereof, exhaust ducts for discharging the heated air from the opposite side of said chamber, and damper means operative to close said air exhaust ducts and thereby confine the heated air within said chamber for discharge thereof to atmosphere upwardly through the sludge deposit.

6. In an apparatus for drying digested sewage sludge, a sub-floor marginally enclosed by upstanding walls, a series of beams elevated above said sub-floor and uniformly spaced in parallel relation across the expanse of said sub-floor, a plurality of drainage elements supported between adjoining pairs of said beams for disposition in substantial coplanar relation to provide a water-pervious bed spaced above said sub-floor, said drainage elements being also enclosed by said walls to provide a marginally enclosed chamber between said sub-floor and said water-pervious bed, and means for introducing heated air into said chamber for drying the sludge deposited on said bed following drainage from the sludge of its excess water content.

7. In an apparatus for drying digested sewage sludge, a sub-floor marginally enclosed by upstanding walls, a series of beams elevated above said sub-floor and uniformly spaced in parallel relation across the expanse of said sub-floor, a plurality of drainage elements supported between adjoining pairs of said beams for disposition in substantial coplanar relation to provide a water-pervious bed spaced above said sub-floor, said drainage elements being also enclosed by said walls to provide a marginally enclosed chamber between said sub-floor and said water-pervious bed, and means for introducing heated air into said chamber for drying the sludge deposited on said bed following drainage from the sludge of its excess water content, said last-mentioned means being operative to direct said heated air upwardly through the sludge deposit.

CHARLES S. HARPER.
FRANK N. MOERK.

(References on following page)

References Cited in the file of this patent

UNITED STATES PATENTS

| Number | Name | Date |
|---|---|---|
| 624,893 | Davis | May 9, 1899 |
| 832,245 | Durbrow | Oct. 2, 1906 |
| 1,122,156 | Pratt | Dec. 22, 1914 |
| 1,135,390 | Ogden | Apr. 13, 1915 |
| 1,151,313 | Wheeler | Aug. 24, 1915 |
| 1,282,771 | Dinesen | Oct. 29, 1918 |
| 1,779,810 | Harritt | Oct. 28, 1930 |
| 2,034,682 | Martin | Mar. 17, 1936 |
| 2,096,176 | Harrington | Oct. 19, 1937 |
| 2,359,985 | Gordon | Oct. 10, 1944 |
| 2,439,853 | Moffett | Apr. 20, 1948 |

FOREIGN PATENTS

| Number | Country | Date |
|---|---|---|
| 407,453 | Great Britain | Mar. 22, 1934 |

OTHER REFERENCES

Metcalf and Eddy: American Sewerage Practice. vol III, 3d ed., 2nd impression, published in 1935 by McGraw-Hill Co., New York, N. Y., pages 723–725.